US011195364B2

United States Patent
Hartmann et al.

(10) Patent No.: US 11,195,364 B2
(45) Date of Patent: Dec. 7, 2021

(54) METHOD FOR OPERATING A DRINKS PREPARATION MACHINE, DRINKS PREPARATION MACHINE AND METHOD FOR OPERATING AN OPERATING APPLIANCE

(71) Applicant: Tchibo GmbH, Hamburg (DE)

(72) Inventors: Doreen Hartmann, Görlitz (DE); Hosun Lee, Hamburg (DE); Dominik Franke, Brüttisellen (CH)

(73) Assignee: TCHIBO GMBH, Hamburg (DE)

( * ) Notice: Subject to any disclaimer, the term of this patent is extended or adjusted under 35 U.S.C. 154(b) by 100 days.

(21) Appl. No.: 16/471,809

(22) PCT Filed: Dec. 19, 2017

(86) PCT No.: PCT/EP2017/083619
§ 371 (c)(1),
(2) Date: Jun. 20, 2019

(87) PCT Pub. No.: WO2018/114996
PCT Pub. Date: Jun. 28, 2018

(65) Prior Publication Data
US 2020/0098218 A1     Mar. 26, 2020

(30) Foreign Application Priority Data
Dec. 23, 2016    (EP) .................................. 16206678

(51) Int. Cl.
*G07F 13/06* (2006.01)
*A47J 31/44* (2006.01)
(Continued)

(52) U.S. Cl.
CPC ........ *G07F 13/065* (2013.01); *A47J 31/4492* (2013.01); *A47J 31/52* (2013.01);
(Continued)

(58) Field of Classification Search
CPC ...... G07F 13/065; G07F 7/1025; A47J 31/52; A47J 31/521; A47J 31/525; A47J 31/4492
See application file for complete search history.

(56) References Cited

U.S. PATENT DOCUMENTS 7,439,859 B2 *  10/2008  Humphrey ........... G06Q 20/105
                                                                222/1
8,442,674 B2 *   5/2013  Tilton ................. G06Q 30/0641
                                                                700/233
(Continued)

FOREIGN PATENT DOCUMENTS

EP    2 768 199    8/2014
EP    3 167 775    5/2017
(Continued)

OTHER PUBLICATIONS

Russian Office Action/Search Report dated May 21, 2021, 2 pages.
(Continued)

*Primary Examiner* — Michael Collins
(74) *Attorney, Agent, or Firm* — Rankin, Hill & Clark LLP (57) ABSTRACT

A method for the operation of a drinks preparation machine, for producing a total product while using a portion package includes the following steps, which are carried out by the drinks preparation machine: a receiving step for receiving, by a communication unit, an activation command for activating a certain action in the drinks preparation machine, and authentication information; an examination step for examining, on the basis of the authentication information, whether the activation command originates from an operating appliance that is authorized for activating the certain action in the drinks preparation machine; and only in the case that the operating appliance is authorized for this. carrying out the action, particularly a production step for producing the total product.

12 Claims, 2 Drawing Sheets

(51) Int. Cl.
*A47J 31/52* (2006.01)
*G07F 7/10* (2006.01)

(52) U.S. Cl.
CPC ........... *A47J 31/521* (2018.08); *A47J 31/525* (2018.08); *G07F 7/1025* (2013.01)

(56) References Cited

U.S. PATENT DOCUMENTS

| | | | |
|---|---|---|---|
| 9,864,947 B1* | 1/2018 | Sur | G06K 19/07788 |
| 2006/0188620 A1 | 8/2006 | Gutwein et al. | |
| 2008/0215385 A1* | 9/2008 | Veitch | G06Q 10/02 |
| | | | 705/6 |
| 2013/0015956 A1* | 1/2013 | Wegelin | G16H 40/20 |
| | | | 340/10.1 |
| 2013/0096715 A1* | 4/2013 | Chung | G06Q 20/387 |
| | | | 700/233 |
| 2013/0282169 A1* | 10/2013 | Moore | G07F 7/00 |
| | | | 700/235 |
| 2014/0142748 A1* | 5/2014 | Geigel | H04W 4/80 |
| | | | 700/237 |
| 2014/0163725 A1* | 6/2014 | Wilinski | B67D 7/34 |
| | | | 700/237 |
| 2015/0144652 A1 | 5/2015 | Kline et al. | |
| 2015/0230653 A1* | 8/2015 | Cheng | H04W 8/24 |
| | | | 426/433 |
| 2016/0086419 A1* | 3/2016 | Geigel | G07F 9/026 |
| | | | 700/237 |
| 2016/0092851 A1* | 3/2016 | De Berg Hewett | G06Q 20/401 |
| | | | 705/15 |

FOREIGN PATENT DOCUMENTS

| | | |
|---|---|---|
| EP | 3 168 815 | 5/2017 |
| RU | 2 553 081 | 6/2015 |
| WO | 2004/030435 | 4/2004 |
| WO | 2016/087190 | 6/2016 |

OTHER PUBLICATIONS

English translation of International Preliminary Report on Patentability dated Jun. 25, 2019 (Jun. 25, 2019), Application No. PCT/EP2018/038619, 6 pages.

* cited by examiner

METHOD FOR OPERATING A DRINKS PREPARATION MACHINE, DRINKS PREPARATION MACHINE AND METHOD FOR OPERATING AN OPERATING APPLIANCE

BACKGROUND OF THE INVENTION

Field of the Invention

The invention relates to drinks preparation machines for preparing drinks or the like from a portion package with a portion packaging (for example capsule) and with an extraction material (for example, coffee), which is contained in the portion packaging. In particular, it relates to a method for the operation of a drinks preparation machine, to a drinks preparation machine and to a computer program for the operation of an operating appliance.

Description of Related Art

Drinks preparation machines for preparing drinks or the like from an extraction material that is present in a portion package are known, for example, as coffee machines or espresso machines. In many corresponding systems, the portion packaging is designed as capsules, in which the extraction material is sealed, for example in an airtight manner. For extraction, the capsule is placed in a capsule receiver and is pierced, for example at two sides that are opposite to one another. An extraction fluid—generally hot water—is then introduced at the first side. The extraction product is discharged from the capsule at the second side. This takes place in a so-called brewing module.

Apart from a brewing module, one or more further units for delivering and adding a further drinks component such as, for example, milk, can be present. The drinks preparation machine can therefore create a drink or generally speaking a total product of two part-products.

The European patent application No. 15 194 735 describes a method for the operation of a drinks preparation machine for creating a product of several part-products, wherein quantity shares of the part-products can be adapted by a user on a graphic display of the quantity shares.

The European patent application No. 15 194 667 describes a method for the operation of a drinks preparation machine whilst using preparation parameters that are determined by way of a portion code of a portion package. Herein, the individual preparation parameters are adaptable by the user.

Amongst other things, the option of a communication of the drinks preparation machine with an operating appliance that can be mobile and portable, for example a mobile telephone or smartphone, is described in the aforementioned patent applications. By way of the operating appliance, preparation prescripts or recipes can be transmitted to the drinks preparation machine, or preparation prescripts that are stored in the drinks preparation machine can be modified. One envisages the preparation being activated by an operating step that is carried out by the user at the drinks preparation machine itself.

SUMMARY OF THE INVENTION

One possible object of the invention is to realise an operation of the drinks preparation machine that is comfortable for the user and at the same time is reliable and to provide a corresponding method for the operation of a drinks preparation machine, a drinks preparation machine and a computer program that permit the realisation.

A further possible object of the invention is to simplify the operation of the drinks preparation machine for the user.

The method therefore serves for the operation of a drinks preparation machine, for producing a total product whilst using a portion package, wherein the drinks preparation machine includes a communication unit, which is designed for wireless communication, and wherein the method includes at least the following steps, which are carried out by the drinks preparation machine:

a receiving step for receiving, by the communication unit, an activation command for activating a certain action in the drinks preparation machine, and authentication information;

an examination step for examining, on the basis of the authentication information, whether the activation command comes from an operating appliance, which is authorised for activating the certain action in the drinks preparation machine, in particular for the remote activation of a production;

and only in the case that the operating appliance is authorised for this:

carrying out the action, in particular a production step for producing the total product.

In an embodiment, the authentication information is transmitted (transferred) in the form of a password. This can be a known PAP ("password authentication protocol"). Herein, the password can always the same one, or it can be systematically changed.

In an embodiment, the authentication information is determined in a multi-step method, in which the drinks preparation machine and the operating appliance exchange information. This can be a known CHAP ("challenge-handshake authentication protocol").

In an embodiment, the authentication information is determined in another further method, for example an EAP ("extensible authentication protocol") method, a certificate-based cryptographic method or a method that utilises an authentication server, such as Kerberos.

The authentication information represents the fact that the operating appliance has a certain identity or belongs to a certain group of operating appliances. Typically, authentication information and thereby an identity or group affiliation of an operating appliance is each assigned to certain authorisations or authorisation stages. Such authorisations can define which actions an operating appliance can activate in the drinks preparation machine. Actions can be machine actions, concerning which a production unit of the drinks preparation machine (for example a base unit or a supplementary unit) is activated, for example by way of operating actuators or hardware units such as pumps, heating elements, valves, etc. for producing a product or for cleaning the machine. Actions can also be the reading or writing of data, which is stored in the drinks preparation machine.

An authorisation can, for example, be a table that includes an assigned logical value "true" or "false" for one or more actions, the logical value expressing whether the action is permitted to be carried out. However, an authorisation can also be implemented implicitly or procedurally and stored in the drinks preparation machine, for example by a program that process a variable that represents an authorisation (for example with the values "uppers stage" or "lower stage") and branches according to the value of this variable and by way of this executes or does not execute an action.

In embodiments, the drinks preparation machine is configurable for wireless communication with several operating appliances, wherein different authorisations are assigned to these operating appliances, and actions of the drinks preparation machine are activatable or not activatable by an operating appliance in accordance with the authorisation which is assigned to this operating appliance.

In embodiments, the examination step includes the following steps, which are carried out in the drinks preparation machine:
- determining, on the basis of the authentication information, an authorisation that is assigned to the authentication information;
- examining whether this authorisation permits the activation of the certain action, in particular of the remote activation of a production.

The determining of the authorisation on the basis of the authentication information can be effected by way of the authentication information being compared to one or more pieces of authentication information that are stored in the drinks preparation machine and to each of which an authorisation is assigned. This assignment can be realised in the drinks preparation machine in different manners, for example in a list that contains several pairs of authentication information and authorisations, by which means an authorisation is assigned to authentication information by way of each pair. The assignment can alternatively also be effected by way of a list of authentication information being assigned to each authorisation. Thereby, an authorisation is also assigned to each piece of authentication information.

In embodiments, at least one upper authorisation and one lower authorisation are stored in the drinks preparation machine, and the drinks preparation machine is designed for carrying out machine actions by way of actuators of the drinks preparation machine, wherein
- only the upper authorisation includes that at least one machine action, in particular a production step, is permitted to be activated;
- the lower authorisation includes that no machine action, in particular a production step, is permitted to be activated.

With this, it is possible to assign such different authorisations to different operating appliances, which results in operating appliances with an upper authorisation being authorised to activate machine actions, but not those with a lower authorisation.

In embodiments, additionally at least one middle authorisation is storable in the drinks preparation machine, wherein
- only the upper authorisation also includes an action for newly creating or for changing a middle authorisation being permitted to be activated;
- the middle authorisation includes that at least one machine action, in particular a production step, is permitted to be activated.

Herein, in embodiments, precisely three (or precisely two if no middle authorisation is present) authorisations are present. In other embodiments, groups each with several lower, middle and upper authorisations are present. Herein, the authorisations of a certain group with respect to the aforementioned machine actions and the creation or changing of middle authorisations are the same, but can also differ with regard to other actions.

In embodiments, on creating a middle authorisation, this middle authorisation is stored in the drinks preparation machine together with assigned authentication information.

In embodiments, the creation of a middle authorisation for a second operating appliance is carried out by a first operating appliance, wherein the following steps are carried out:
- the first operating appliance communicates with the drinks preparation machine and with its communication unit, respectively, and activates in the drinks preparation machine the creation of a middle authorisation, wherein in the drinks preparation machine basic authentication information is assigned to this middle authorisation;
- the first operating appliance transmits remote authentication information to the second operating appliance, the remote authentication information permitting the second operating appliance to authenticate itself at the drinks preparation machine on the basis of the basic authentication information, which is stored in the drinks preparation machine.

The basic authentication information that is used here can be the same as authentication information that is already stored in the drinks preparation machine or it can be transmitted from the first operating appliance to the drinks preparation machine. This implies that the authorisation, which is stored in the drinks preparation machine as being assigned to the first operating appliance, is an upper authorisation and that this was successfully examined before the transmission or the storing in the drinks preparation machine is permitted.

In embodiments, the basic authentication information and the remote authentication information are identical, for example equal to a common key or cryptographic "salt" that is used for generating one or more keys.

In other embodiments, the basic authentication information and the remote authentication information is different from one another and the basis for the authentication of the second operating appliance is at the drinks preparation machine. For example, they can be a public and a corresponding secret key of a "public-key" encoding method.

In embodiments, a second communication medium, via which the first operating appliance transmits the remote authentication information to the second operating appliance, is different from a first communication medium, via which the first operating appliance communicates with the drinks preparation machine.

Thereby, one can prevent a hacker from obtaining all information by way of listening in on the communication via a single communication medium, in order to pretend to be a user.

In embodiments, the first operating appliance transmits the remote authentication information to the second operating appliance via a communication that only operates within short-range, in particular by one of:
- displaying a character string on a display of the first operating appliance and manually inputting this code at the second operating appliance;
- displaying a visual code, for example a barcode, on a display of the first operating appliance and optically scanning and decoding the code by the second operating appliance;
- an acoustic signal;
- a short-range radio protocol, for example Bluetooth or NFC.

The visual code can also be displayed by way of a temporally changing brightness of the display.

The acoustic signal can be sent by way of a loudspeaker of the first operating appliance and be received by a microphone of the second operating appliance.

In embodiments, the assignment of an authorisation to an operating appliance is realised by way of operating appliances of the same authorisation using the same (i.e. a common) authentication information and an authorisation, which is stored in the drinks preparation machine being assigned to this (common) authentication information.

In this case, the authentication information represents the fact that an operating appliance belongs to a certain group of operating appliances, which all have the same authorisation. Thus an authorisation which is stored in the drinks preparation machine and is assigned to the authentication information can thereby be determined after the drinks preparation machine has received certain authentication information. This authorisation applies to all operating appliances of this group. Then, in accordance with this authorisation, one can determine whether a certain action or read or write access is permitted to be activated in the drinks preparation machine by the operating appliance.

In embodiments, the assignment of an authorisation to an operating appliance is realised by way of each of the operating appliances using individual authentication information and an authorisation which is stored in the drinks preparation machine being assigned to this individual authentication information.

In this case, the authentication information represents the fact that an operating appliance is a certain individual, for example with an unambiguously assigned identifier, and no other operating appliance with the same authentication information exists. An authorisation, which is stored in the drinks preparation machine and is assigned to the authentication information, can thereby be then determined after the drinks preparation machine has received certain authentication information. This authorisation is valid for precisely this one operating appliance (Although other, equal authorisations can exist, their assignment to an operating appliance is however expressed by way of a further assignment between an operating appliance and authentication information). In accordance with this authorisation, one can then determine whether a certain action or a read or write access is permitted to be activated in the drinks preparation machine by the operating appliance.

In embodiments, a certain action in the drinks preparation machine, in particular the production step, can only be activated if a corresponding activation command is received in a radio network which is defined by the drinks preparation machine itself as the base station. In this case, the drinks preparation machine or its communication unit therefore forms a wireless access point or base station of the radio network.

The drinks preparation machine is designed for carrying out the aforementioned method, inasmuch as the described steps are carried out on the drinks preparation machine.

The computer program serves for operation of the operating appliance for interaction with a user and for wireless communication with a communication unit of the drinks preparation machine. On execution on the operating appliance, the computer program carries out least the following steps for creating a middle authorisation for a second operating appliance:

sending a command for creating a middle authorisation with assigned basic authentication information in the drinks preparation machine, to the drinks preparation machine;

sending remote authentication information that permits the second operating appliance to authenticate itself at the drinks preparation machine on the basis of the basic authentication information, which is stored in the drinks preparation machine, to the second operating appliance.

The operating appliance includes an input device and an output device that can be combined as a touchscreen, as well as a data processing unit and a communication unit for communication with the drinks preparation machine. The operating appliance can be a mobile, in particular portable device, for example a mobile telephone or smartphone, or a functionally equivalent device such as a smart-watch or a wearable computer. The operating appliance can also be installed in a fixed manner, for example as part of a building automation facility or kitchen automation facility. Thanks to the operating appliance, operating elements, in particular the input device and output device of the operating appliance and its programmability and computation power can be utilised for activation of the drinks preparation machine.

The operating appliance can be designed for carrying out at least a part of the described method. The operating appliance communicates with the drinks preparation machine via a communication connection. Herein, typically data that is representative of a receptacle selection or total volume, absolute or relative quantity shares and optionally further parameters of part-products, such as for example temperature, sequence of preparation of part-products, name of the drink, name of the user, preparation hints and recommendations, capsule preference, is transmitted to the drinks preparation machine. Further data can be confirmation inputs, which display to the system the fact that the user has carried out a displayed user instruction. Initial values for quantity shares, user instructions, etc., which are to be displayed, can be transmitted from the drinks preparation machine to the operating appliance.

In an embodiment, the system includes a supplementary unit which is designed for feeding milk as a second part-product, optionally amid the heating of the milk, as well as for forming and feeding milk froth as a third part-product, into the total product.

The computer program for execution on the operating appliance can be loaded into an internal memory of a digital processing unit of the operating appliance and includes computer program code means which, when they are carried out in the digital data processing unit of the operating appliance, bring this to carry out the steps of the aforedescribed method which are envisaged for the operating appliance. A computer program product includes a data carrier, or a computer-readable medium, on which the computer program code means are stored.

In embodiments, the drinks preparation machine is provided with a feed unit that can automatically feed portion packages and transport them into the capsule receiver. The feed unit can be designed for the selective feeding of portion packages of different types. An automatic production of total products of different types is possible with this. Herein, on producing the total product in accordance with the preparation prescript, a matching portion package, which is to say one that is consistent with the preparation prescript, can be automatically fed.

In further embodiments with such a feed unit, several receiving steps each with an activation command and an assigned preparation prescript as a production task can be carried out in the drinks preparation machine. These steps can be stored and successively worked off in separate production steps. Optionally, after completion of a production step, a completion confirmation step is carried out in each case for notifying the user. The examination steps and confirmation steps can each be carried out before carrying out the individual productions steps. A user instruction can also be sent between production steps, in order to request the user to replace a just filled receptacle with an empty one before the beginning of a production step.

In embodiments, a programming of the production with a certain temporal delay is not accepted if the absolute time, for which the production step is to take place, lies within an interval of a predefined length—for example three minutes—before or after the absolute time for an already stored production step.

In embodiments, information that describes stored preparation prescripts or production tasks is displayed on the operating unit or on the operating appliance. Such information can be the time of the production and/or the name of a recipe. Moreover, also only the information that a stored preparation prescript or a production task is present can be displayed, for example by way of a light display, in particular an LED.

BRIEF DESCRIPTION OF THE DRAWINGS

The subject-matter of the invention is hereinafter explained in more detail by way of preferred embodiment examples, which are represented in the attached drawings. In each case in a schematic manner are shown in.

DETAILED DESCRIPTION OF INVENTION

Basically, in the figures the same parts are provided with the same reference numerals.

Figure 1:
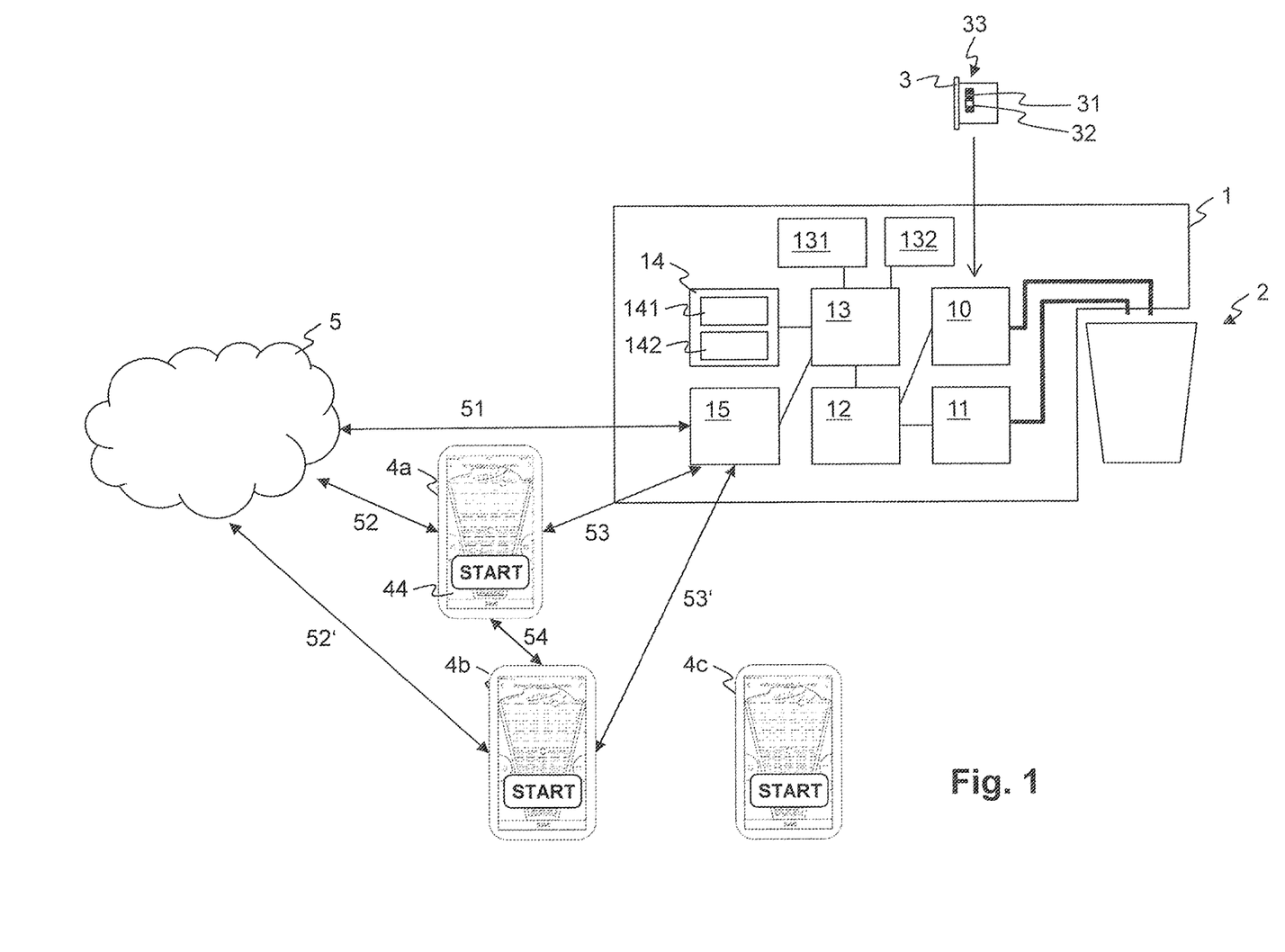
FIG. 1 a system for drinks preparation.

FIG. 1 shows a system for drinks preparation with a drinks preparation machine 1 for filling a receptacle 2 with at least one extraction material from a portion package 3. The drinks preparation machine 1 can be connected to a communication network 5 such as an intranet or the internet via a first communication connection 51. An operating appliance 4a, 4b, 4c, which can be mobile and portable, for example a mobile telephone or smartphone, or a dedicated device, which is only provided for operation of the drinks preparation machine 1, can communicate with the drinks preparation machine 1 in an indirect manner via a second communication connection 52, 52' and the communication network 5 or directly via a third communication connection 53, 53'. Two operating appliances 4a, 4b can communicate with one another via a fourth communication connection 54, either bidirectionally or at least unidirectionally, for example from a first operating appliance 4a to a second operating appliance 4b.

The drinks preparation machine 1 includes a base unit 10 for extracting an extraction product by way of an extraction fluid. The drinks preparation machine 1 is for example a portion capsule coffee machine of the type known per se, wherein the base unit 10 is a brewing module and the extraction fluid is hot water that is under pressure. The extraction product is fed to the receptacle 2

The portion package 3 includes a portion packaging (for example, a capsule) and an extraction material (for example, coffee), which is contained in the portion packaging.

The drinks preparation machine 1 include a supplementary unit 11 that can deliver or produce at least one further product or part-product, for example milk and/or milk froth, which are likewise fed to the receptacle 2. The supplementary unit 11 can include heating elements and/or cooling elements for heating or cooling at least one further product.

The extraction product and the at least one part-product are fed to the receptacle 2 in a simultaneous or sequential manner and together form a total product in the receptacle 2, for example a "caffe macchiato" consisting of coffee, cold or warm milk, and cold or warm milk froth. A total product is represented schematically as consisting of a first share 21, a second share 22 and a third share 23. The shares in the receptacle 2 can be layered above one another or mixed, depending on the preparation prescript. A "share" is to be understood as a volume share or quantity share.

For the control of the base unit 10 and the supplementary unit 11, for the operation by the user and for the optional communication with other devices, the drinks preparation machine 1 includes a control unit 2, a superordinate control unit 13, an operating unit 14 and a communication unit 15.

The control unit 12 is configured for the activation of the base unit 10 and the supplementary unit 11, for example by way of it activating pumps, valves, heating elements etc. of these units and detecting (acquiring) measured values of temperatures, pressures, flow etc., and processing these. The function of the control unit 12 can be realised by a single physical electronic unit, for example a microcontroller, or by several physical units or microcontrollers that are each assigned to the base unit 10 and the supplementary unit 11 and communicate with one another via a communication bus or transmit individual analog or binary signals via signal leads.

The superordinate control unit 13 is configured for activating the operating unit 14 and the communication unit 15. The superordinate control unit 13 can be realised in a manner in which it is separated from the control unit physically and/or with regard to program technology, or however together with the control unit 12 can form a single unit. In this context, according to embodiments, the control unit 12 and the superordinate control unit 13 can be identical.

The operating unit 14 includes an input unit 141, for example with switches, keys and/or a jog dial or adjusting wheel and/or a touch-sensitive surface, as well as an output unit 142 with optical display means such as lights or a screen etc. and/or acoustic display means such as a loudspeaker, summer, etc. In embodiments, the operating unit 14 includes no screen. Information concerning the programming of the drinks preparation machine 1 can then be displayed on the screen of the operating appliance 4.

The communication unit 15 is configured for communication via the first communication connection 51 which can be wireless (for example by way of Wi-Fi, Bluetooth, etc.) or wire-connected (for example by way of Ethernet, USB), in particular for communication with the communication network 5. Furthermore, the communication unit 15 can communicate with the operating unit 4 in a wireless manner (for example by way of Wi-Fi, Bluetooth, NFC, etc.) or in a wire-connected manner (for example by way of USB). The communication unit 15 can also be configured for reading out and writing a removable portable data carrier, for example via a USB interface or SD-card interface.

One or more operating appliances 4a, 4b, 4c can be present. Such an operating appliance 4, typically a mobile telephone or smartphone includes a user interface 44, for example a touch-sensitive screen or touchscreen, which functions as an input and output unit. Additionally or alternatively, buttons (keys) of the operating appliance 4 can also serve as input units. A speech input can be realised additionally or alternatively to this.

Where not otherwise mentioned, information can be outputted to the user and inputs of the user can be inputted, via the operating unit 14 and/or the operating appliance 4. In the present description, whenever therefore interactions with the user are described, it is to be understood that this is thereby also to mean outputs or inputs by way of the operating unit 14 and/or by way of the operating appliance 4. Generalised, these can therefore be termed as an interface unit.

The superordinate control unit 13 includes a memory 131, in which amongst other things preparation prescripts or recipes are stored. A preparation prescript includes at least control information that can be converted into commands for the control of the base unit 10 and of the supplementary unit 11. Such control information on the one hand includes sequence information, which specifies a sequence of steps that are to be carried out by the base unit 10 and/or supplementary unit 11 for producing a total product. On the other hand, the control information includes, for example, temperatures, volume details, time details, etc.—hereinafter generally also called preparation parameters—which parameterise a sequence.

Sequence information represents, for example, "switch on the water heating means of the supplementary unit 11; switch on the pump of the brewing module for fifteen seconds; wait for at least five seconds after switching off the pump until the heating means is at the desired temperature; switch on the milk pump for twelve seconds". The times and temperatures that are mentioned in this example can be specified by preparation parameters and/or be determined by the control in accordance with other preparation parameters and measured values of sensors.

A preparation prescript can also include user instructions. These instructions are part of the preparation of the total product and must be carried out by a user. For this, the user instructions can be displayed by way of the output unit 142 or the user interface 44 of the operating appliance 4. For example, such user instructions are "now add ice cubes" or "please measure 20 ml of caramel syrup" or "now add the prepared caramel syrup" or "please stir" or "please examine whether the inserted capsule and selected recipe match" etc. A user instruction can be accompanied by a visual representation, for example of the total product to be created, of a selected or actually inserted capsule etc.

For preparing a product, control information or corresponding commands are implemented by the base unit 10 and the supplementary unit 11 in accordance with the preparation prescript and a preparation sequence is realised by this. If the preparation prescript includes user instructions, then these are displayed to the user at corresponding locations of the sequence. Subsequent control information of the preparation sequence is implemented after an acknowledgement by the user by way of the input unit 141 or the user interface 44, the acknowledgement confirming the execution of the user instruction to the system.

A preparation prescript can include preparation parameters, which are permitted to be adapted by the user, as well as preparation parameters, which cannot be adapted by the user. Adaptable preparation parameters, for example, are (volume) shares of part-products in the total product, a total quantity, or the temperature of a part-product. For adaptable preparation parameters, the preparation prescript can include a standard value or default value, which is used if the user does not adapt the parameter.

For adapting adaptable preparation parameters, a selection of one or more such preparation parameters is displayed to the user on the operating unit 14 of the drinks preparation machine 1 or the user interface 44 of the operating appliance 4 and an input of the user for adapting the preparation parameter is detected. The input can be effected by way of actuating real buttons and/or virtual buttons such as keys or "buttons" in particular "arrow keys" and/or displaceable markings or "sliders" on a touchscreen of the operating unit 14 or of the operating appliance 4.

The operating unit 4 transmits information, which represents the detected user inputs, such as quantity shares, selection of the receptacle or total quantity, temperature selection etc., to the drinks preparation machine 1 in a direct manner via the third communication connection 53 or indirectly via the second communication connection 52 and the first communication connection 51.

The portion package 3 is provided with a machine-readable portion code 33. This can be realised by information carriers that are readable, for example, in an optical, mechanical or wireless manner via radio, or by a combination of two or more such information carriers. The portion code 33 represents a portion category 31 that specifies a category, to which the portion package 3 is assigned. Such categories can be different categories of drinks or products, such as "Espresso", "normal coffee", "filter coffee", "tea" and also "special capsule". The portion code 33 moreover represents a portion identity 32, to which the portion package 3 is assigned. Such identities can represent certain individual products or varieties, such as "Arabica No. 42" or "Colombia special". Portion packages 3 with the same portion category 31 can have different portion identities 32. Portion packages 3 or corresponding products of a different identity can therefore be grouped into categories by way of the portion category 31.

An assignment of the portion code 33 or of portion categories 31 and/or portion identities 32, in each case to recommended or allowable ranges for preparation parameters can be stored in the drinks preparation machine 1. With this, after inserting a portion package 3 and on the basis of the portion code 33, one can automatically examine whether the portion package 3 is compatible with the quantity shares which are set by the user and/or whether the portion package 3 is consistent with a preparation prescript that is selected by the user, thus that this is suitable for the preparation prescript. If this is not the case, then a warning can be displayed and/or the further processing of the portion package 3 can be stopped. Alternatively, a positive message can also be generated if the selected capsule is particularly well suited for the selected quantity shares. For example, an espresso capsule is not optimally suited should a coffee quantity, which is envisaged for a normal coffee, be selected by the user. Also a cleaning capsule or a tea capsule is basically not suitable if the preparation of a drink with milk has been selected.

Figure 2:
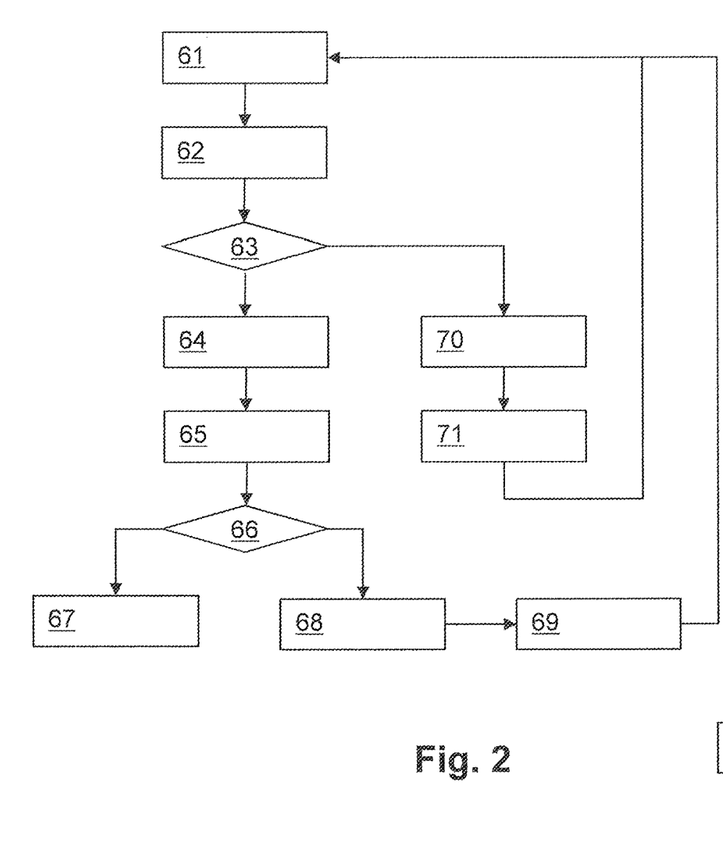
FIGS. 2-3 flow diagrams of methods for the operation of the drinks preparation machine.

FIG. 2 shows a flow diagram of a sequence of a method for operating the drinks preparation machine 1. This method ensures the ability of a production process to be carried out. Where not stated otherwise, the steps are carried out by the drinks preparation machine itself. The steps are the following:

Receiving step 61: a wireless communication unit 15 of the drinks preparation machine 1 receives an activation command.

Examination step 62: it is examined whether the drinks preparation machine 1 is ready for producing a total product.

Branching 63, depending on whether the drinks preparation machine 1 is ready or not.

If the drinks preparation machine 1 is ready:

Confirmation step 64 for sending, by way of the communication unit 15, a confirmation that the activation command was received and the drinks preparation machine 1 is ready for producing a total product:

Production step 65, in which the production of the total product by the drinks preparation machine 1 takes place;

Second branching 66, depending on whether the production has taken its course in an error-free manner.

If the production has taken its course in an error-free manner,

Completion confirmation step 67, in which a completion confirmation that the production of the total product is completed is sent by way of a commutation unit 15. The operating appliance 4 shows a corresponding display for the user. The implementation of the completion confirmation step 67 can be effected in various manners, for example by way of a "push" method, in which the drinks preparation machine 1 actively sends a message to the operating appliance 4, or by way of a "polling" method, in which the operating unit 4 repeatedly enquires the status of the drinks preparation machine 1

If the production has not taken its course in an error-free manner,

Production error message step 68, in which a production error message that an error has occurred on production of the total product is sent by way of the communication unit 15. The production error message can include information on the type of error and/or its remedying or refer to such information which for example is stored and displayed in the operating appliance 4.

Production error remedying step 69, in which a remedying of the error can be carried out by the user on the basis of the production error message.

Continuation of the method with the receiving step, after the user has sent an activation command afresh by way of the operating appliance 4.

If the drinks preparation machine 1 is not ready:

Error information step 70, in which error information is sent by the communication unit 15, with a confirmation that the activation command has been received but the drinks preparation machine 1 is not ready for producing the total product. The error information depends on the type of the examination step that has determined this. It can relate to the absence of components and/or of a supplementary unit, or to an operating state of the drinks preparation machine or to inconsistencies between the preparation prescript and the current state of the drinks preparation machine.

Error remedying step 71, in which a remedying of the error and/or an adaptation of the preparation prescript can be carried out by the user on the basis of the error information.

Continuation of the method with the receiving step, after the user has sent an activation command afresh by way of the operating unit 4.

Figure 3:
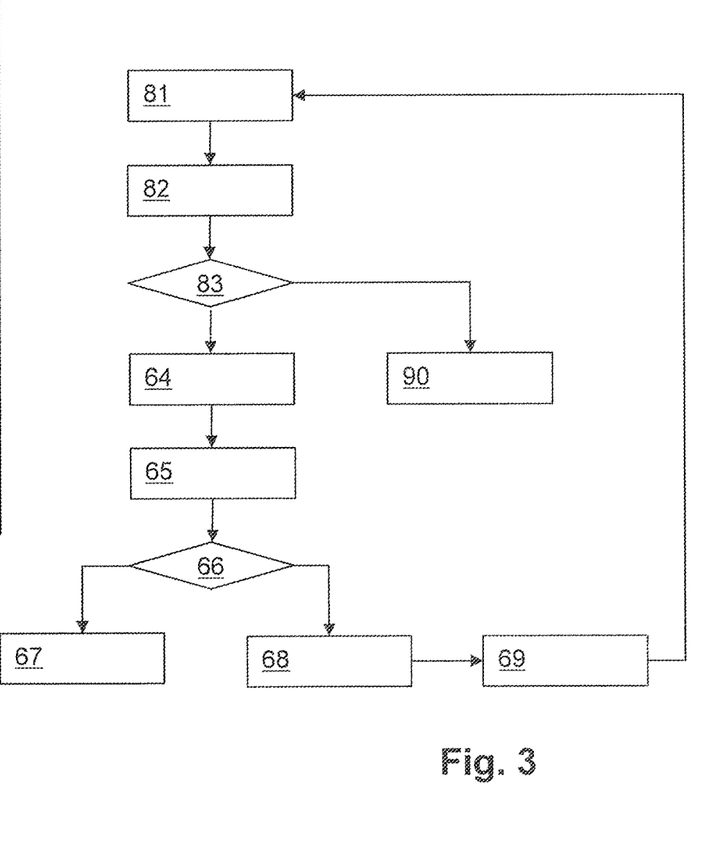

FIG. 3 shows a flow diagram of a sequence of a method for operation of the drinks preparation machine 1. This method ensures the authorisation for carrying out a production process. Where not stated otherwise, the steps are carried out by the drinks preparation machine itself. The steps are the following:

Receiving step 81: a wireless communication unit 15 of the drinks preparation machine 1 receives an activation command and assigned authentication information. The authentication information can then be transmitted as a key. Alternatively, the authentication information can be determined by a multi-step method amid the exchange of information between the drinks preparation machine 1 and an operating appliance 4.

Examination step 82: it is examined on the basis of the authentication information whether the activation command originates from an operating appliance 4a, 4b, 4c, which is authorised for activating the certain action in the drinks preparation machine 1, in particular for the remote activation of a production. This is effected, for example, by way of determining, on the basis of the authentication information, an authorisation, which is stored in the drinks preparation machine 1 and which specifies whether a certain action, in particular the activation of a manufacturing step, is permitted to be activated.

Branching 83, depending on whether the operating appliance 4a, 4b, 4c is authorised or not If the operating appliance 4a, 4b, 4c is authorised:

Confirmation step 64 (optional), manufacturing step 65, and subsequent steps as already described with regard to FIG. 2.

If the operating appliance 4a, 4b, 4c is not authorised:

Authorisation error step 90, in which error information that the activation command was received but the operating unit 4a, 4b, 4c is not ready for activating the certain action, in particular the remote activating of the production, is sent by the communication unit 15. This error information can be displayed at the operating appliance 4.

The method according to the FIGS. 2 and 3 can be combined with one another. For example, from FIG. 2:

the examining step 62 as to whether the drinks preparation machine 1 is ready for producing the total product and the subsequent branching 63, is added in FIG. 3 between     the branching 83 and     the confirmation step 64 (optional) or the production step 65.

Different stages or authorisations can be present. For example, an upper authorisation (or "administrator authorisation"), which permits a production procedure to be activated in the drinks preparation machine 1, is assigned to the first operating appliance 41 in the configuration of FIG. 1. The third operating appliance 4c does not have this authorisation, but only a "lower authorisation" or "user authorisation". With these, preparation prescripts (recipes) can be adapted and transmitted to the drinks preparation machine 1, but the activation of the production must take place at the drinks preparation machine 1 itself, i.e., by way of actuating an operating element on the operating unit 14 of the drinks preparation machine 1. With this, one can ensure that an arbitrary user cannot activate a production process in an uncontrolled manner.

A middle authorisation (or "sub-administrator") can be assigned to the second operating appliance 4b. This middle authorisation permits the activation of the production of a product by this second operating appliance 4b.

The assignment of a middle authorisation to an operating appliance 4 can only be effected by way of an operating appliance 4, to which an upper authorisation is assigned. The first operating appliance 4a with the upper authorisation can thus assign a middle authorisation to another, for example the second operating appliance 4b. This can be realised by way of the first operating appliance 4a assigning a key or generally authentication information to the second operating appliance 4b, wherein a middle authorisation is assigned to this authentication information in the drinks preparation machine 1. This authentication information is transmitted to the second operating appliance 4b from the first operating appliance 4a. For the purpose of interception protection, this is preferably effected via the fourth communication connection 54, which is a channel other than the channel, via which the operating appliances 4 communicate with the drinks preparation machine 1. This other channel is preferably only designed for short-range transmission, for example according to an NFC standard or Bluetooth standard, in contrast to a Wi-Fi standard for communication with the drinks preparation machine 1. The other channel can also be unidirectional, for example by way of an optical signal such as a barcode or Morse code that is outputted from the first operating appliance 4 and is received or scanned by the second operating appliance 4b. An acoustic signal can also be used as a unidirectional signal. The information that is transmitted (transferred) by the signal can be modulated for example onto a carrier signal, in particular by way of modulation in the frequency range and/or modulation in the time range. Amongst these are multi-frequency code methods. The acoustic signal can be produced via a loudspeaker or vibration element. A vibration element or a vibration alarm can be a motor with a rotating mass with an imbalance.

The authentication information, which is assigned to the second operating appliance 4b, can be unambiguous for each of the operating appliances 4:

either as a combination of a common administration key with an individual identification key, which each only indentifies the operating appliance 4 but does not correspond to an authorisation. One can then examine whether the administration key is valid for the drinks preparing machine 1, for determining the authorisation for activating a production process in the drinks preparation machine 1. The identification key is then used for determining whether an operating appliance 4a has an upper authorisation. On configuring the drinks preparation machine 1, one can specify that it is exclusively the first operating appliance 4a, which has this upper authorisation that is used for configuring. Then, for issuing a middle authorisation, only the administrator key can be transmitted to the second operation device 4b. Since the second operating unit 4b has a different identification key than the first, consequently it can have no upper authorisation and cannot modify any authorisations.

Or a combined key that codes the identity as well as the authorisation of an operating appliance 4 can be present. An authorisation that specifies the authorisation for activating a production process and also that for issuing (middle) authorisations to other operating appliances 4 is then assigned to each combined key in the drinks preparation machine 1. The combined key is then transmitted to the second operating appliance 4b on issuing a middle authorisation, and the assignment of the combined key with a middle authorisation is stored in the drinks preparation machine 1.

Generally, it is the case that the different keys or authentication information is not sent from the first operating appliance 4a and must be produced in this. What is relevant is the fact that the authentication information is shared. Herein, the generation of a key pair of a private and public key is also indicated "sharing the authentication information".

The transmission of authentication information can also be effected via a public communication network 5 amid the use of suitable cryptographic methods.

The invention claimed is:

1. A method for the operation of a drinks preparation machine, for producing a total product amid the use of a portion package comprising a portion packaging containing an extraction material which is coffee, wherein the drinks preparation machine comprises a base unit for extracting an extraction product from the extraction material in the portion packaging by way of an extraction fluid, and a communication unit that is designed for wireless communication, and wherein the method comprises at least the following steps, which are carried out by the drinks preparation machine:

a receiving step for receiving, by the communication unit, an activation command for activating a certain action in the drinks preparation machine, and authentication information;

an examination step for examining, based upon the authentication information, whether the activation command originates from an operating appliance that has been assigned an authorization to activate said certain action in the drinks preparation machine, said certain action being a machine action by which the base unit of the drinks preparation machine is activated; and, only in a case that the operating appliance has been assigned the authorization to activate said certain action:

carrying out said certain action;

the authentication information being indicative of
the operating appliance belonging to a specific group of a plurality of groups of operating appliances; or
an identity of the operating appliance;

the examination step comprising the following steps, which are carried out in the drinks preparation machine:

determining, on the basis of the authentication information, an authorization that is assigned to the authentication information, the determining comprising comparing the authentication information to one or more further authentication data which are stored in the drinks preparation machine and wherein to each of the further authentication data an authorization is assigned;

examining whether the authorization permits the activation of the certain action;

the operating appliance comprising a user interface comprising a touch-sensitive screen or touchscreen, which functions as an input unit and as an output unit:

wherein the drinks preparation machine is configurable for wireless communication with several operating appliances, wherein different authorizations are assigned to each of said several operating appliances, and actions of the drinks preparation machine are activatable or not activatable by each operating appliance in accordance with the authorization which is assigned to said operating appliance.

2. The method according to claim 1, wherein said certain action is a production step for producing the total product.

3. The method according to claim 1, wherein at least one upper authorization and one lower authorization are stored in the drinks preparation machine, and the drinks preparation machine is designed for carrying out machine actions by way of actuators of the drinks preparation machine, wherein
only the upper authorization also includes that at least one machine action is permitted to be activated;
the lower authorization includes no machine action being permitted to be activated.

4. The method according to claim 3, wherein additionally at least one middle authorization is storable in the drinks preparation machine, wherein
only the upper authorization also includes that an action for newly creating or for changing a middle authorization is permitted to be activated;

the middle authorization includes that at least one machine action is permitted to be activated.

5. The method according to claim 4, wherein on creating a middle authorization, this middle authorization is stored in the drinks preparation machine together with assigned authentication information.

6. The method according to claim 5, wherein the creation of a middle authorization for a second operating appliance is carried out by a first operating appliance, wherein the following steps are carried out:
the first operating appliance communicates with the drinks preparation machine and with the drinks preparation machine communication unit, respectively, and activates in the drinks preparation machine the creation of a middle authorization, wherein in the drinks preparation machine basic authentication information is assigned to this middle authorization;
the first operating appliance transmits remote authentication information to the second operating appliance, said remote authentication information permitting the second operating appliance to authenticate itself at the drinks preparation machine based upon the basic authentication information which is stored in the drinks preparation machine.

7. The method according to claim 6, wherein a second communication medium, via which the first operating appliance transmits the remote authentication information to the second operating appliance, is different from a first communication medium, via which the first operating appliance communicates with the drinks preparation machine.

8. The method according to claim 6, wherein the first operating appliance transmits the remote authentication information to the second operating appliance via a communication which only operates within short-range, in particular by one of:
displaying a character string on a display of the first operating appliance and manually inputting the character string at the second operating appliance;
displaying a visual code on a display of the first operating appliance and optically scanning and decoding said visual code by the second operating appliance;
an acoustic signal; and,
a short-range radio protocol.

9. The method according to claim 1, wherein the assignment of an authorization to an operating appliance is realized by way of operating appliances of the same authorization using the same authentication information and an authorization stored in the drinks preparation machine being assigned to this authentication information.

10. The method according to claim 1, wherein the assignment of an authorization to an operating appliance is realized by way of each of the operating appliances using individual authentication information and an authorization stored in the drinks preparation machine being assigned to this individual authentication information.

11. The method according to claim 1, wherein the certain action in the drinks preparation machine can only be activated if a corresponding activation command is received in a radio network, which is defined by the drinks preparation machine itself as the base station.

12. A drinks preparation machine, designed for carrying out the method according to claim 1.

* * * * *